UNITED STATES PATENT OFFICE.

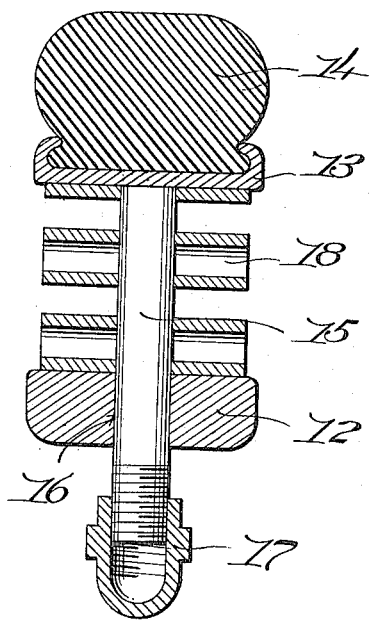
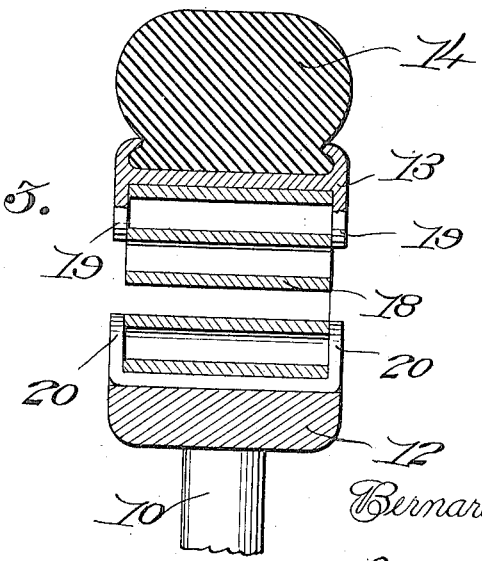

BERNARD C. NADEAU, OF FALL RIVER, MASSACHUSETTS.

RESILIENT WHEEL.

1,221,362. Specification of Letters Patent. Patented Apr. 3, 1917.

Application filed June 4, 1914. Serial No. 843,075.

*To all whom it may concern:*

Be it known that I, BERNARD C. NADEAU, a citizen of the United States, residing at Fall River, in the county of Bristol and State of Massachusetts, have invented certain new and useful Improvements in Resilient Wheels, of which the following is a specification.

This invention relates to a resilient wheel and the principal object of the invention is to provide improved means for securing springs between the inner and outer rims of the wheel, the springs being so mounted that they may give freely without having any tendency toward lateral movement.

Another object of the invention is to provide improved means for guiding the radial movement of the outer rim with respect to the inner rim, the said means serving as an additional means for preventing lateral movement of the springs and also serving to prevent lateral movement of the two rims.

Another object of the invention is to provide a wheel which will be very resilient and thereby make it unnecessary to use an inflated tire.

This invention is illustrated in the accompanying drawings, wherein—

Fig. 2 is a sectional view taken along the line 2—2 of Fig. 1; and

Fig. 3 is a sectional view taken along the line 3—3 of Fig. 1.

Figure 1:
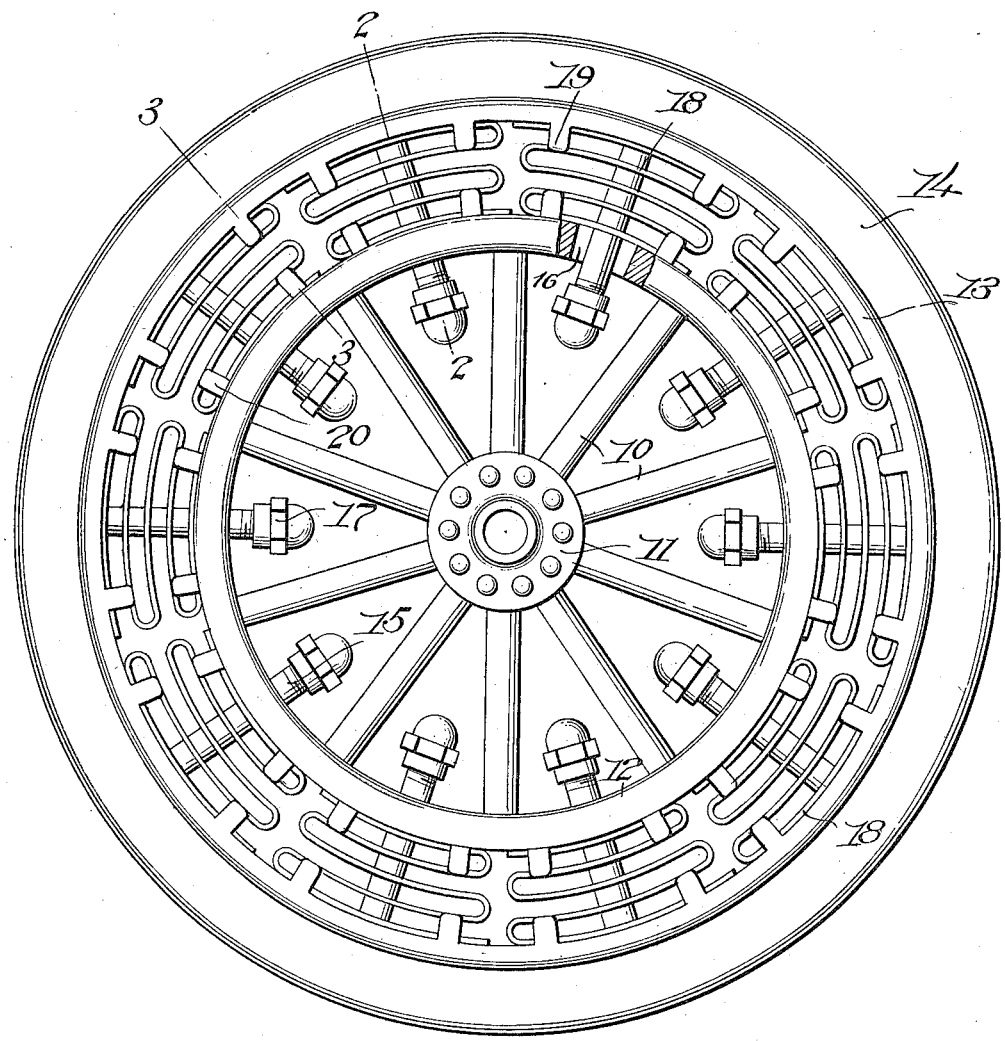
Figure 1 is a side elevation of the improved wheel.

The spokes 10 lead from the hub 11 to the inner rim 12 and hold the inner rim in spaced relation to the hub. The outer rim 13 which carries the tire 14 surrounds the inner rim and is provided with guiding pins 15 which extend through openings 16 formed in the inner rim. Caps 17 are screwed upon the pins 15 to limit the sliding movement of these pins and prevent any danger of their passing entirely through the rim 12 in an outward direction. Springs 18 are placed between the inner and outer rims and are provided with openings through which the pins 15 pass so that the pins may serve to prevent lateral movement of the springs as well as serving to guide the movement of the outer rim toward the inner rim. Ears 19 extend from the outer rim along the sides of the end portions of the springs 18 and similar ears 20 extend from the inner rim and are positioned in alinement with the ears 19 as shown in Fig. 1. These ears 19 and 20 serve to prevent pivotal movement of the springs upon pins 15 and also serve to prevent any danger of lateral movement by the springs. These springs 18 are of the leaf type and converge toward the inner rim as clearly shown in Fig. 1 so that the folds of the springs may be compressed without the folds of one spring interfering with the adjacent springs. It should also be noted that the springs are so formed that the joined ends of the folds of each spring will be positioned in alinement with the space between the folds of the adjoining springs, thus preventing all danger of the folds of one spring interfering with the folds of the adjoining springs.

When this wheel is in use, the weight is taken up by the springs and any jolting received by going over rough roads will be taken up by the springs thus preventing the automobile or other vehicle from being jolted and making it unnecessary to use resilient tires. If it is desired to remove a spring for replacing a broken spring with a new one the pin 15 which passes through the broken spring can be removed and the broken spring then taken out and a new one put in place. I have therefore provided a resilient wheel which is very simple in construction but which will operate very efficiently and take up all jolts and jars and therefore make it unnecessary to provide a resilient tire. The tire 14 can be formed of any suitable material such as leather, solid rubber or any other material the tire 14 being simply provided to prevent skidding and to permit the automobile to travel without creating noise.

What is claimed is:—

A resilient wheel including an inner rim, and an outer rim, springs positioned between said inner and outer rims and formed of flat resilient strips folded back upon themselves to provide a plurality of folds and having their folds extending substantially parallel between the inner and outer rims, ears extending from the inner and outer rims to engage the sides of the springs adjacent the ends thereof, and guiding pins carried by said outer rim and slidably passing through the springs and inner rim.

In testimony whereof I affix my signature in presence of two witnesses.

BERNARD C. NADEAU.

Witnesses:
　FRANK X. PERRON,
　JEAN B. PARADIS.

Copies of this patent may be obtained for five cents each, by addressing the "Commissioner of Patents, Washington, D. C."